Aug. 12, 1952 V. P. HOWARD 2,606,786
PANEL TYPE TRUCK BODY WITH HINGED
PANELS FORMING PLATFORMS
Filed April 1, 1950 2 SHEETS—SHEET 1

INVENTOR.
VERNAL P. HOWARD,
BY
ATTORNEY.

Aug. 12, 1952 V. P. HOWARD 2,606,786
PANEL TYPE TRUCK BODY WITH HINGED
PANELS FORMING PLATFORMS
Filed April 1, 1950 2 SHEETS—SHEET 2
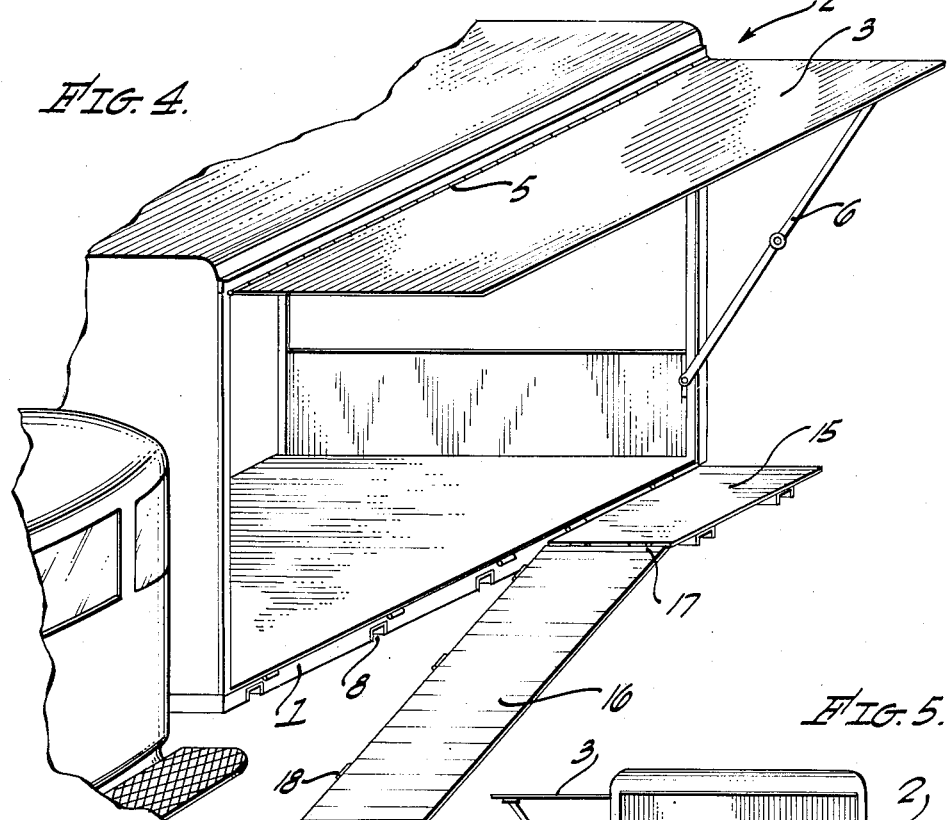
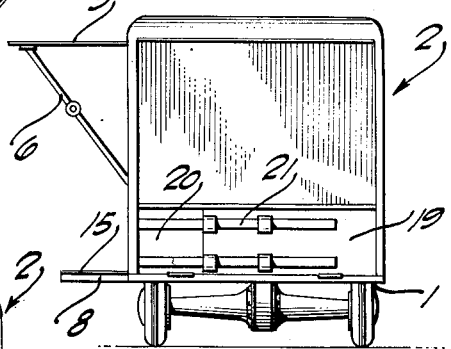
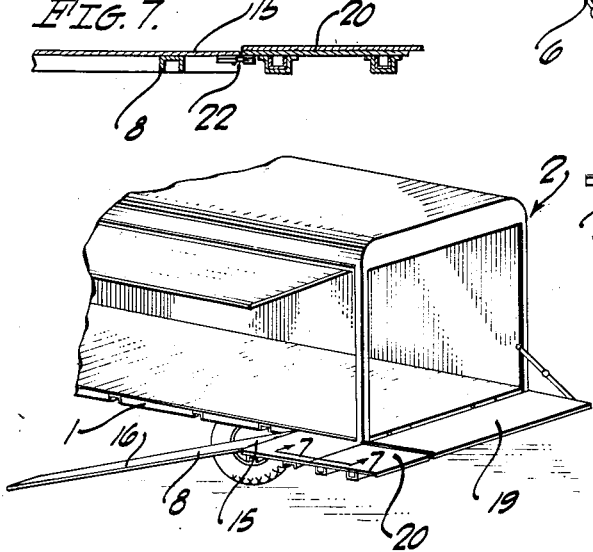
INVENTOR.
VERNAL P. HOWARD,
BY
ATTORNEY.

Patented Aug. 12, 1952

2,606,786

UNITED STATES PATENT OFFICE 2,606,786

PANEL TYPE TRUCK BODY WITH HINGED PANELS FORMING PLATFORMS

Vernal P. Howard, Long Beach, Calif.

Application April 1, 1950, Serial No. 153,463

4 Claims. (Cl. 296—61)

This invention relates to a panel type truck body in which the panels are so mounted on the body that they may be lowered and supported in position to be used as a platform for the loading or unloading of the truck.

An object of my invention is to provide a novel panel type truck body in which a panel is hingedly mounted and can be lowered to a horizontal position and supported in this position by means of extensible arms.

Another object of my invention is to provide a novel panel type truck body in which panels are so mounted on the body that they can be lowered to form an inclined loading or unloading ramp, which extends from the floor of the truck to the ground.

A feature of my invention is to provide a novel panel type truck body of the character stated, in which the entire side of the truck body can be opened to give access to the entire length of the truck, and, further, that a portion of the side panel of the truck may be used as a platform extending substantially the entire length of the truck.

Another feature of my invention is to provide a novel panel type truck, which will materially facilitate the loading and unloading of the truck, that is, boxes or crates, or other articles in the truck and positioned at the front end thereof, can be as readily removed or unloaded as those boxes or crates positioned at the rear of the truck.

Other objects, advantages and features of invention may appear from the accompanying drawing, the subjoined detailed description and the appended claims.

In the drawing:

Figure 4 is a fragmentary perspective view of my truck body showing an inclined ramp.

Figure 5 is a rear elevation of my truck body.

Figure 6 is a fragmentary perspective view of my truck body showing the end gate in lowered position.

Figure 7 is a fragmentary sectional view taken on line 7—7 of Figure 6.

Figure 1:
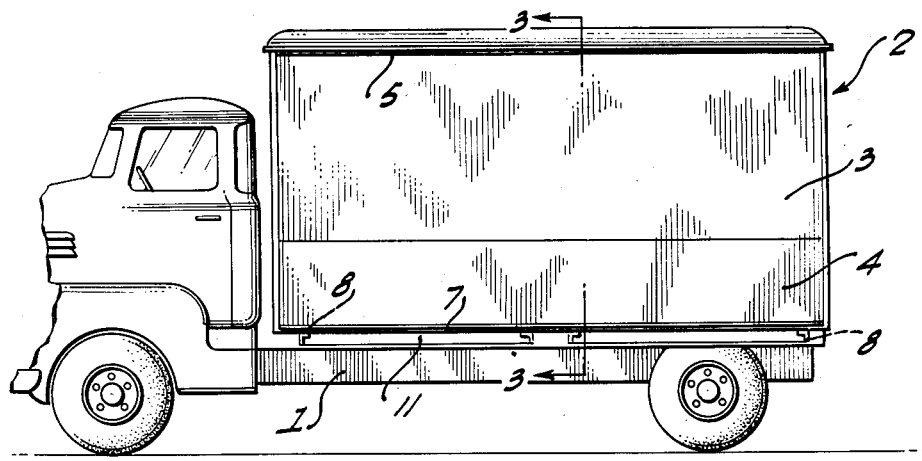
Figure 1 is a side elevation of my truck body.

Referring more particularly to the drawing, the numeral 1 indicates the usual and well known truck chassis on which is mounted a panel type body 2.

Figure 2:
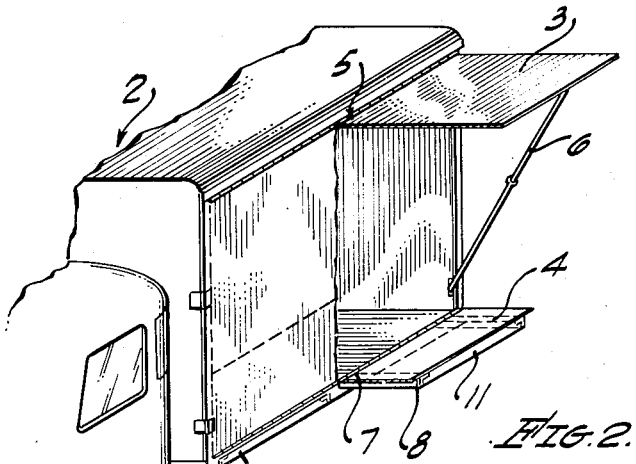
Figure 2 is a fragmentary perspective view of the same.
Figure 3:
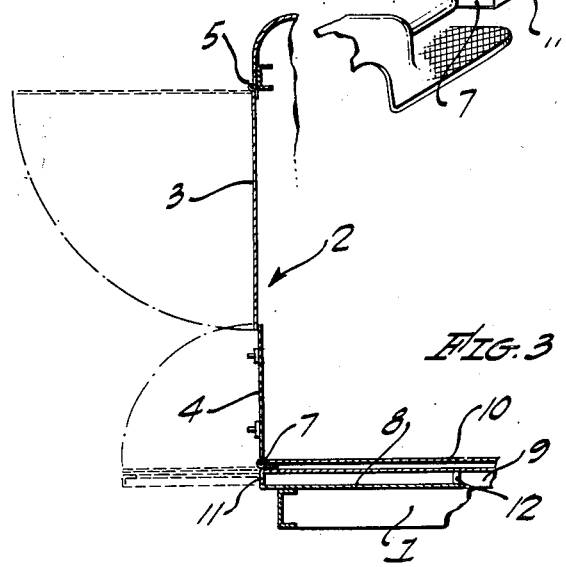
Figure 3 is a fragmentary sectional view taken on line 3—3 of Figure 1.

The body 2 includes longitudinal panels 3—4 on each side thereof. The panel 3 is hinged at the top to the truck body by the hinge 5, and this hinge is preferably a so-called piano type, however, any suitable type of hinge may be employed. The panel 3 can be swung upwardly, as shown in Figures 2 and 3, and is held in raised position by a suitable brace 6. The panel 4 is hinged to the truck body along its lower edge by the hinge 7, and this hinge also is preferably of the piano type, although any suitable type of hinge may be employed. The panel 4 is supported in a horizontal position to form a platform, as shown in Figures 2 and 3.

To support this panel in its horizontal position, I provide a plurality of extensible arms 8, which slide into the space 9, under the floor 10 of the truck. The arms 8 are preferably structural members, such as a channel, and the various arms may be connected by a longitudinal member 11, which ties these arms together causing them to operate together. When the arms 8 are pulled outwardly, it will be evident that they will support the panel 4 in a horizontal position, as shown in Figure 2, and the workers can then stand on this panel as a platform while loading or unloading the truck. When not in use, the arms 8 are pushed inwardly and are substantially flush with the side of the truck and are thus out of the way. A stop 12 is provided to prevent the arms 8 from moving inwardly beyond a position where they can be grasped by the user. A suitable loose pin latch is provided on both the panels 3 and 4, to hold these panels in closed position, as when the truck is normally moving from place to place.

As shown in Figures 4 to 7, inclusive, the lower side panel 15 has a hinged end or section 16, which may be dropped down to the ground to form an inclined ramp so that hand trucks may be moved up or down this ramp for the purpose of loading or unloading the truck. The parts 15 and 16 of the lower panel are hinged together, as shown at 17, to form a substantially continuous ramp over which workmen may move.

The hinges 18 which connect the inclined ramp 16 to the body are of the loose pin type so that the pin can be removed when it is desired to use the part 16 as an inclined loading ramp.

Under the same circumstances, it may be desirable to unload from the rear of the truck, and under these circumstances, the tail gate 19 is provided with a laterally extensible section 20, which slides in the channels 21 to either extended or closed position.

To connect the sections 15 and the tail gate

20, I may provide a loose pin hinge 22, thus further supporting the sections and forming a substantially rigid platform.

It is believed obvious that, if desired, the inclined ramp portion 16 can extend from the tail gate 20, if the truck is of short wheel base and if it is necessary.

Having described my invention, I claim:

1. A panel type truck body comprising upper and lower side panels on said body, means hingedly attaching the upper and lower panels to said body, and arms extending from the truck body and supporting the lower panel in horizontal position, and means hingedly attaching the forward portion of said lower side panel to the remaining rearward portion of the side panel, said forward hinged portion of the lower panel being adapted to extend to the ground.

2. A panel type truck body comprising upper and lower side panels on said body, means hingedly attaching the upper and lower panels to said body, and extensible arms extending from the truck body and supporting the lower panel in horizontal position, a tail gate hingedly mounted on the truck body, a laterally extensible section slidably mounted on the tail gate, and means releasably coupling said extensible portion of the tail gate to said lower side panel, a ramp section forming part of said lower side panel, means hingedly coupling said ramp section of the remaining horizontal section of the side panel.

3. A panel type truck body comprising upper and lower side panels on said body, means hingedly attaching the upper panel adjacent the upper part of the body, and the lower panel adjacent the bottom part of the body, extensible arms mounted on the truck body and extending therefrom to support the lower panel in horizontal position, a tail gate horizontally mounted adjacent the lower part of the truck body, a laterally extensible section slidably mounted on the tail gate, and means releasably coupling said extensible portion of the tail gate to the rear end of the lower side panel.

4. A panel type truck body comprising upper and lower side panels on said body, means hingedly attaching the upper panel adjacent the upper part of the body, and the lower panel adjacent the bottom part of the body, extensible arms mounted on the truck body and extending therefrom to support the lower panel in horizontal position, a tail gate horizontally mounted adjacent the lower part of the truck body, a laterally extensible section slidably mounted on the tail gate, and means releasably coupling said extensible portion of the tail gate to the rear end of the lower side panel, a ramp section forming part of said lower side panel, and means hingedly coupling said ramp section to the remaining horizontal section of the side panel.

VERNAL P. HOWARD.

REFERENCES CITED

The following references are of record in the file of this patent:

UNITED STATES PATENTS

| Number | Name | Date |
|---|---|---|
| 540,866 | Mally | June 11, 1895 |
| 1,396,420 | Glinchikoff | Nov. 8, 1921 |
| 1,758,457 | Miller | May 13, 1930 |
| 2,278,450 | Jones | Apr. 7, 1942 |
| 2,337,615 | McLaren | Dec. 28, 1943 |
| 2,358,446 | Couse | Sept. 19, 1944 |
| 2,451,275 | Cercownay | Oct. 12, 1948 |
| 2,519,517 | Van Tassel | Aug. 22, 1950 |

FOREIGN PATENTS

| Number | Country | Date |
|---|---|---|
| 23,086 | Great Britain | June 25, 1914 |
| 154,846 | Germany | Oct. 7, 1904 |